United States Patent

[11] 3,566,881

| [72] | Inventors | Harold L. Link;<br>Ferdinand J. Dumanowski, San Jose, Calif. |
|---|---|---|
| [21] | Appl. No. | 767,736 |
| [22] | Filed | Oct. 15, 1968 |
| [45] | Patented | Mar. 2, 1971 |
| [73] | Assignee | FMC Corporation<br>San Jose, Calif. |

[54] TOMATO HARVESTER SHAKING MECHANISM
8 Claims, 7 Drawing Figs.

[52] U.S. Cl. ................................................. 130/30,
171/28, 56/327
[51] Int. Cl. ........................................................ A01d 45/00
[50] Field of Search ........................................... 130/30, 30
(A), 27.6, 30 (F), 30 (P); 171/14, 28, 27, 130;
56/327

[56] References Cited
UNITED STATES PATENTS

| 1,592,962 | 7/1926 | Sample | 171/130 |
| 2,255,193 | 9/1941 | Steelman | 130/27.6 |
| 3,203,430 | 8/1965 | Lorenzen et al. | 130/30 |
| 3,237,699 | 3/1966 | Bretveld et al. | 171/131 |
| 3,252,520 | 5/1966 | Hill et al. | 171/27 |
| 3,330,363 | 7/1967 | Greedy | 171/27 |

Primary Examiner—Antonio F. Guida
Attorneys—F. W. Anderson and C. E. Tripp

ABSTRACT: Tomatoes are shaken from their vines by an endless shaker conveyor comprising first and second linearly moving shaker sections which are independently oscillated in relatively opposite directions at a maximum velocity that exceeds the linear velocity of the shaker conveyor.

PATENTED MAR 2 1971
3,566,881
SHEET 1 OF 4
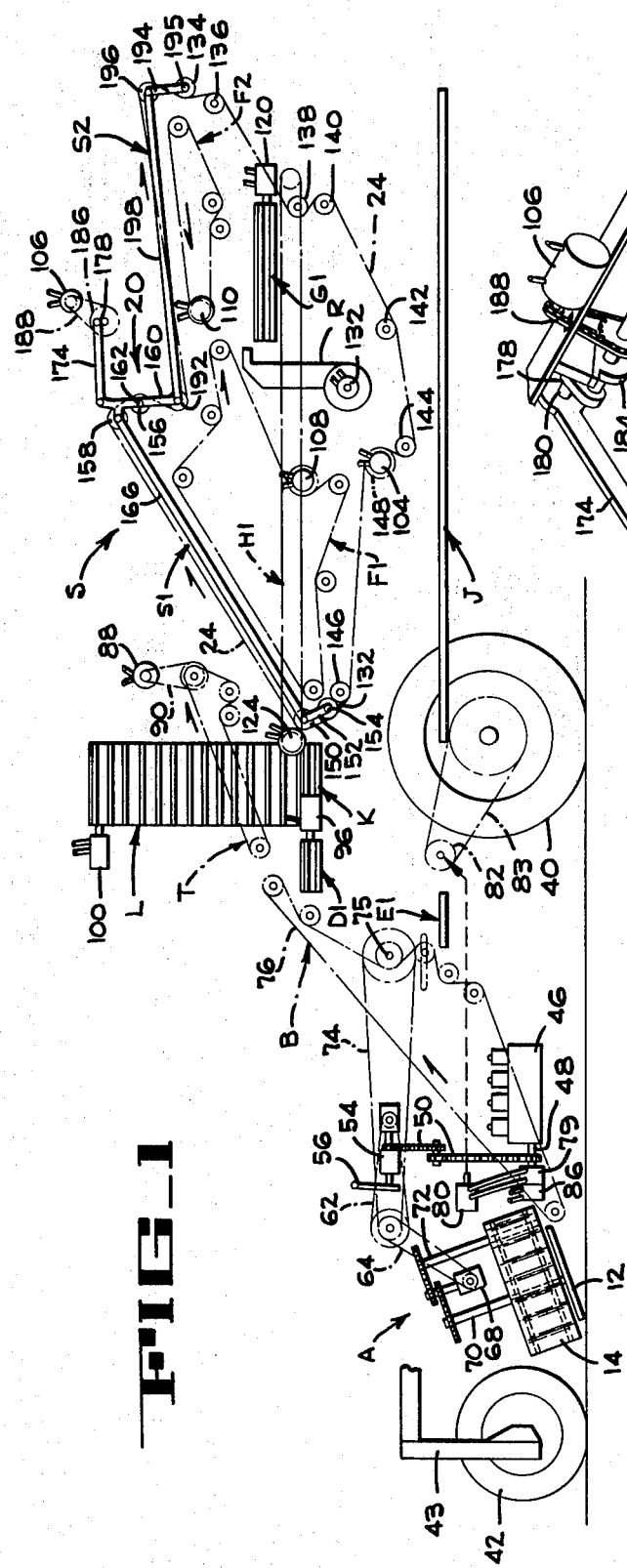
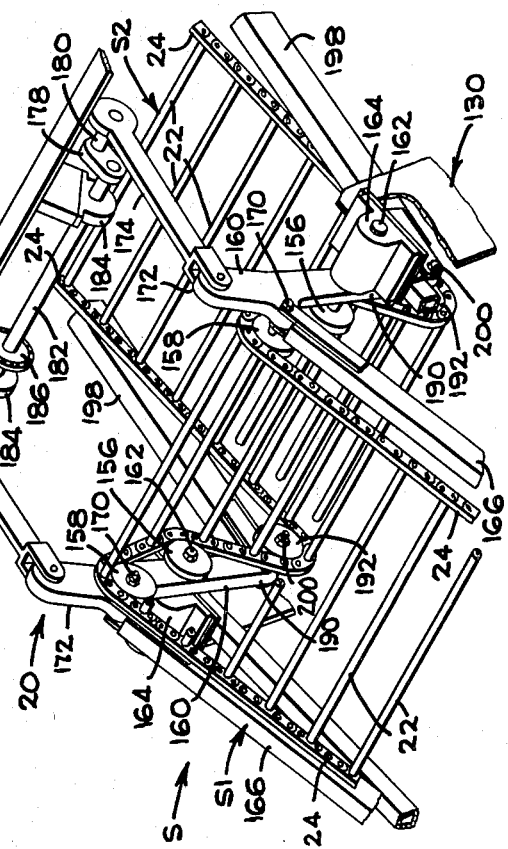
INVENTORS
HAROLD L. LINK
FERDINAND J. DUMANOWSKI
BY Francis W. Anderson
Charles E. Tripp
ATTORNEYS

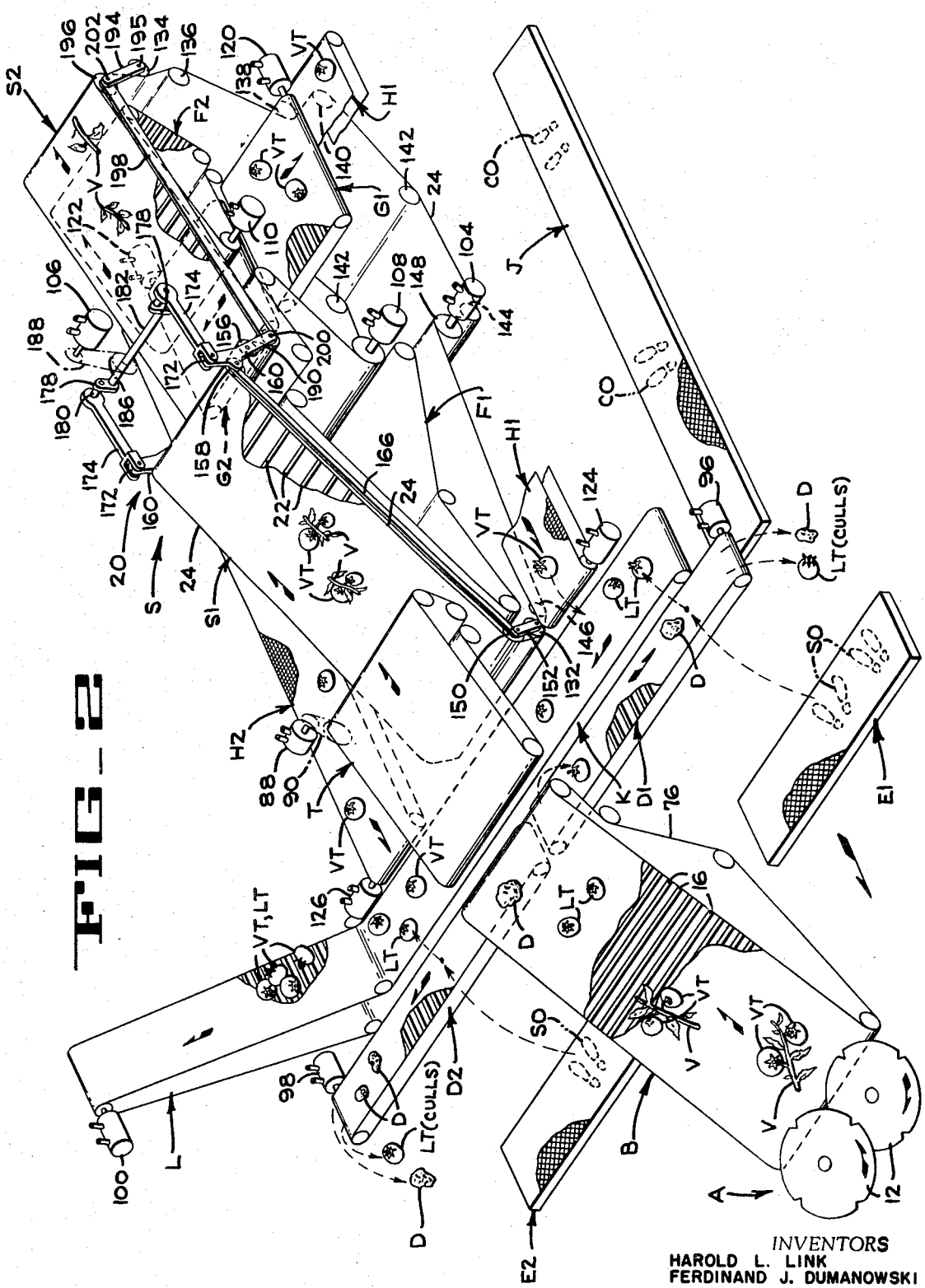

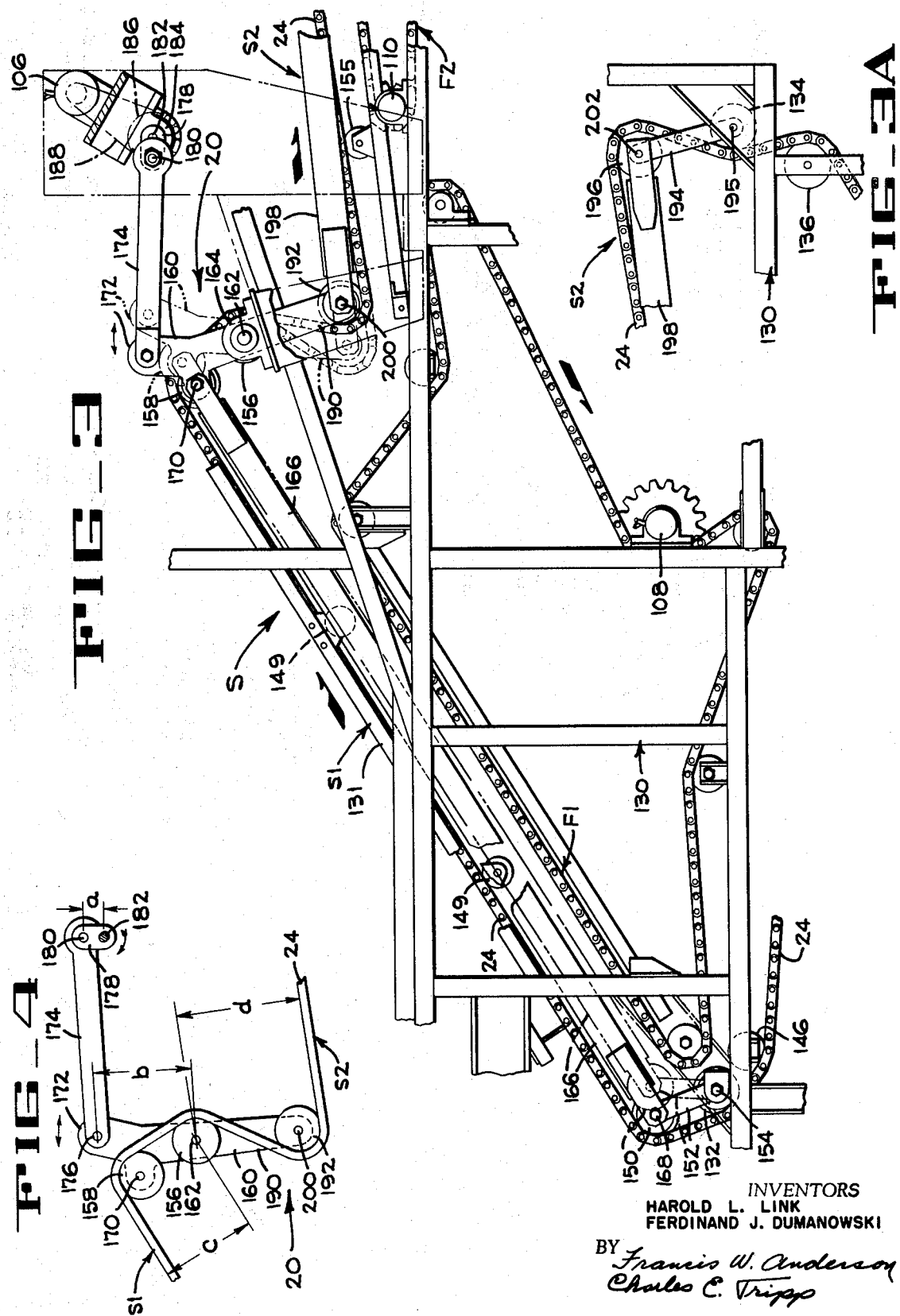

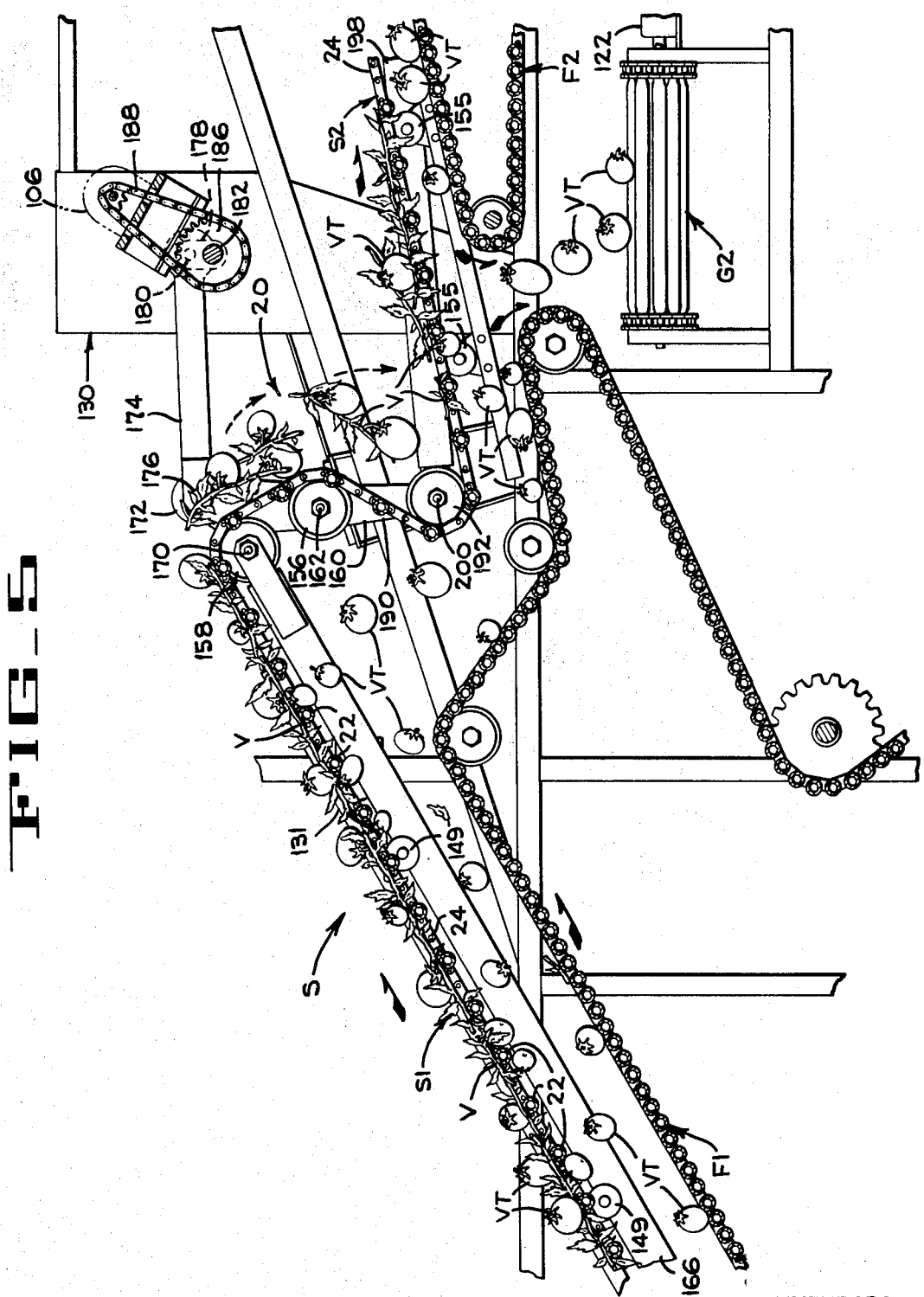

TOMATO HARVESTER SHAKING MECHANISM

BACKGROUND OF THE INVENTION

1. Field of the Invention

This invention relates to harvesting and more particularly to an improved shaking mechanism having a special application to tomato harvesters.

2. Description of the Prior Art

German Pat. No. 1,072,422 of Dec. 31, 1959 drops potatoes and dirt onto the first of two oppositely oscillating shaker bars, the oscillations serving to feed the mass along the bars.

Innes Pat. No. 2,559,965 of Jul. 10, 1951, drops potatoes and vines onto transversely moving shaker bars.

Dutch Pat. No. 56,132 issued Apr. 15, 1944, Russian Certificate No. 124,737 issued Apr. 19, 1960 and German Pat. No. 483,304 of Sept. 3, 1939 show the feeding of crops to detaching means which involves the step of dropping the crops by unspecified distance.

Rodin Pat. No. 2,209,282 (FIG. 9) slides potatoes from a conveyor onto an endless conveyor with eccentric shaker sprockets.

SUMMARY OF THE INVENTION

In the harvesting of tomatoes wherein the tomatoes remain attached to their vines and are picked up as a mass, the mere shaking of the mass has not been found completely satisfactory because tomatoes become imbedded and impacted in the mass. In accordance with the present invention, after preliminary shaking on an endless moving and oscillating conveyor, the mass with remaining tomatoes is dropped or cascaded in a manner which fluffs and reorients the mass. The falling mass is caught by a second linearly moving shaker which is also oscillated to detach the remaining tomatoes from the mass. The maximum velocity of oscillation of the first shaker exceeds its linear velocity, which imparts motions and momentums to the tomatoes in the falling mass and greatly enhances the fluffing and toning action during their fall from the first to the second shaker sections. The result is efficient detachment of tomatoes from their vines without requiring excessive long oscillatory strokes of the shakers with attendant vibration and deterioration of the machine.

BRIEF DESCRIPTION OF THE DRAWINGS

FIG. 1 is a diagrammatic side elevation of a tomato harvester embodying the present invention showing the various driving mechanisms.

FIG. 1A is an enlarged perspective of the shaker at the dropoff or cascading section.

FIG. 2 is a schematic perspective of the tomato harvester showing the various conveyors and other elements.

FIG. 3 is an enlarged fragmentary side elevation showing the first shaker section and the oscillating mechanism for both shaker sections.

FIG. 3A is a view of the discharge end of the second shaker section.

FIG. 4 is a diagram showing certain dimensions of the oscillating mechanism for the shakers.

FIG. 5 is a view like that of FIG. 4 illustrating operation of the shaker sections of the present invention.

DESCRIPTION OF THE PREFERRED EMBODIMENT

GENERAL HARVESTER DESCRIPTION

The tomato harvester of this invention represents an improvement in the tomato harvesters described in the U.S. Pat. No. 3,301,331, to Looker et al. issued Jan. 31, 1967, and in the U.S. Pat. No. 3,340,935, of Csimma, issued Sept. 12, 1967 and in the application Ser. No. 633,937, of Boyce, filed Apr. 26, 1967, all assigned to the assignee of the present invention. The invention will be described as installed on a tomato harvester such as that of Boyce.

In these machines, vines bearing attached tomatoes are cut off and deposited on a feeder conveyor, along with loose tomatoes, loose dirt and clods of dirt. The loose tomatoes and clods drop from the feeder conveyor onto dirt belts from which the loose tomatoes are manually removed upstream of a shaker. The vines and attached tomatoes continue onto a shaker, which detaches tomatoes from the vines.

The general arrangement of the frame structure, the wheels and their mounting, the construction and mounting of the cutting discs and the undulating side delivery belts, as well as mechanical drive elements for these parts as well and the feeder conveyor are all described in detail in the copending application Ser. No. 527,827 of Manfre, filed Aug. 15, 1966 and in the U.S. Pat. No. 3,330,363 to Greedy, issued Jul. 11, 1967, also assigned to the assignee of the present invention. Many of these mechanical details are not critical to the present invention and hence will not be described in detail in this specification. The aforesaid disclosures are incorporated herein by reference for a disclosure of mechanical designs suitable for the construction of a harvester that embodies the present invention.

The basic units of the tomato harvester will now be briefly described. As the harvester moves down the field, the pickup assembly A, FIG. 1, severs growing vines and picks them up, along with their attached tomatoes, as well as loose tomatoes lying on the ground. The pickup assembly is described in more detail and claimed in the aforementioned application of Greedy. It includes a pair of rotating, notched cutting wheels 12 (FIG. 2) which are normally set so that their leading edges scrape along beneath the surface of the ground. The crop thus picked up is advanced rearwardly by a pair of undulating side belts 14 shown in FIG. 1, it being understood that the details of the pickup mechanism are not critical to the invention.

The mass of vines with attached tomatoes, loose tomatoes, and incidental dirt, is advanced onto a feeder conveyor B which is formed of closely spaced slats 16 connected at their ends to side chains. FIG. 2 illustrates how the vines V, vine attached tomatoes VT, loose tomatoes LT and clods of dirt D, are all conveyed and elevated by the feeder conveyor B.

The vines V and their attached tomatoes VT are carried over from the feeder conveyor B to a transfer conveyor T. This is a beltlike member driven by side chains. The marketable size loose tomatoes LT and most clods D do not reach the transfer conveyor T; they drop off over the end of the feeder conveyor B, and fall onto transversely running loose material conveyors D1, D2 (FIG. 2), sometimes referred to as the "dirt belts.". Thus the loose tomatoes, which are usually the ripest tomatoes, leave the mass of vines and vine attached tomatoes before the latter reach the shaking device, as claimed in the aforesaid patent to Looker et al. 3,301,331.

Running laterally behind the dirt belts is a combined collector conveyor K and a loading conveyor L, in the form of a single endless conveyor. These conveyors receive and load both loose and vine detached tomatoes into a truck.

Front sorting platforms E1, E2 are positioned alongside of the loose material or dirt belts D1, D2, so that sorting operators SO whose footprints are indicated in broken lines on the platforms) can stand and inspect the loose tomatoes dropped onto belts D1, D2. The sorting operators SO select the good loose tomatoes LT on the belts D1, D2 and transfer them manually to the collecting conveyor K, leaving the cull loose tomatoes LT and the clods D to run off the ends of the belts D1, D2.

As mentioned, the vines V and the vine attached tomatoes VT bridge the gap between the feeder conveyor B and the transfer conveyor T and are conveyed along the transfer conveyor T, which drops them onto a shaker assembly S of the present invention. The shaker assembly S is a chain driven slat conveyor which comprises two sections S1 and S2 that oscillate independently, with a connecting drop off or cascade section 20 for tumbling and fluffing the mass. The shaker S includes slats 22 connected to driving side chains 24 (FIG. 1A), and hence provides an open platform which supports the vines and attached tomatoes but permits detached tomatoes to fall through.

Tomatoes. VT detached from the vines by the first oscillating shaker section S1 drop between the slats 22 and onto an undershaker conveyor F1.

After passing over the cascade section 20, tomatoes still attached to their vines are shaken loose by the second oscillating shaker section S2, and fall onto a second undershaker conveyor F2.

The undershaker conveyors F1 and F2 deliver detached tomatoes from the respective shaker section S1 and S2 to oppositely running, rear collecting cross conveyors G1, G2. The stripped vines V run off the rear end of shaker section S2 (FIG. 2) and out of the rear of the machine.

In order to present the vine detached tomatoes VT for inspection by side culling operators, longitudinal side sort conveyors H1, H2 receive tomatoes from the rear collecting conveyors G1, G2. Culling operators, CO whose footprints are indicated on platforms J, only one being shown, throw off the cull tomatoes, leaving the good tomatoes VT on the side sort conveyors H1, H2. The culling operators CO can also throw off clods of dirt D, vine fragments, and other trash reaching the side sort conveyors.

As mentioned, the detached and sorted tomatoes VT on the side sort conveyors H1, H2 are combined with the loose tomatoes LT removed from the dirt belts D1, D2, on the collecting conveyor K, and are carried via the elevator conveyor section L into bins or trucks as market tomatoes.

As seen in FIG. 1, a blower R is provided for blowing vines and trash clear of the rear collecting conveyor G1, G2, although this blower is not a feature of the present invention.

GENERAL MECHANICAL DETAILS

Before describing in detail the improved association of shaker elements of the present invention, reference will now be made to the various drive mechanisms. In the exemplary machine illustrated herein, rear drive wheels 40 (FIG. 1) drive the harvester along the ground at about 50—90 feet per minute, as described in the previously mentioned Csimma patent. The front steering wheel 42 is mounted on a vertically adjustable mounting frame 43, for selecting the height of the pickup mechanism A above the ground, as shown in the aforesaid U.S. patent to Greedy.

The notched vine cutting wheels 12 are mechanically driven at a peripheral speed of approximately 250 feet per minute, in a manner to be briefly mentioned presently. The undulating side belts 14 (only one appears in FIG. 1) are driven at a linear speed of approximately 70 feet per minute, in the example herein given.

FRONT END DRIVES

The harvester is powered by an internal combustion engine 46 (FIG. 1) having an output shaft 48 which operates a sprocket chain drive 50 for a clutch 54. The clutch is engaged by a manual lever 56 to cut in the front end mechanism. The clutch 54 drives a sprocket chain drive mechanism 62, 64 and a right angle gear box 68 for a chain drive to the shafts 70 of the cutters 12. The gear box 68 also chain drives shafts 72 for the side belts 14, as is fully disclosed in the Csimma patent.

In order to drive the feeder conveyor B, a sprocket chain drive 74 (FIG. 1) is driven from the chain drive 62, and turns a countershaft 75 which drives sprockets that engage the side chains 76 of the conveyor. The chains are trained around entry and exit sprocket shaft assemblies and various idlers. The drives are such that when the harvester is operated along the ground at a linear speed of about 70 feet per minute, the feeder conveyor B will be operated at a linear speed of about 72 feet per minute.

The drive wheels 40 are hydraulically driven. A hydraulic pump 79, operated by the engine shaft 48, is connected to a hydraulic system indicated schematically by two pipes connected to a hydraulic motor 80. Through gearing, not shown, the hydraulic motor 80 turns jackshaft sprockets 82 which sprockets may be driven through differential gearing, not shown, on their shaft. Sprockets 82, by means of a sprocket chain drive 83, turn the rear wheels 40 individually.

HYDRAULIC MATERIAL HANDLING DRIVES

The material handling drives now to be described are operated by hydraulic motors in a hydraulic system. The hydraulic system for driving the various conveyors is not, in the and of itself, critical to the invention and conventional hydraulic engineering design is employed.

As seen in FIG. 1, a second hydraulic pump 86 is operated from the engine shaft 48, and supplies oil under pressure for driving the various hydraulic motors to be mentioned. The transfer conveyor T is driven by a hydraulic motor 88 through a chain and sprocket drive 90, for driving the side chains of the conveyor. The transfer conveyor T is operated, in the example being given, at a linear speed of approximately 75 to 80 feet per minute.

The loose material conveyors or dirt belts D1, D2 are driven directly by hydraulic motors 96, 98 which turn the side chains of these conveyors at a linear speed adequate to dispose of their load and accommodate sorting.

The combined collector and tomato delivery conveyors K, L are driven by a hydraulic motor 100 at the delivery end of the conveyor, driving sprockets which engage the conveyor side chains. The collector conveyor is driven at a linear speed high enough to deliver the tomatoes it receives.

The shaker conveyor side chains 24 are driven by a hydraulic motor 104 at about 130—150 ft./min.

The shaker sections S1 and S2 are longitudinally oscillated at about 225—260 cycles/min. by a hydraulic motor 106 and associated linkage, to be described in detail presently.

The side chains of the undershaker conveyors F1 an and F2 are driven by hydraulic motors 108, 110 respectively. The conveyors are driven, in the example herein presented, at a linear speed of approximately 81 feet per minute.

The rear transverse collecting conveyors G1, G2 are individually driven in opposite directions by hydraulic motors 120, 122 and at a linear speed adequate to carry away their load.

The longitudinally running side sort conveyors H1, H2 are driven by hydraulic motors 124, 126 (FIG. 2), and at a linear speed adequate to handle the fruit for sorting.

The blower R is driven directly by a hydraulic motor 132, FIG. 1.

GENERAL SHAKER CONSTRUCTION

Referring to FIG. 3, portions of the shaker for frame 130 are shown which support the shaker and s associated elements. The nature of the framework is not critical to the present invention, but rather represents simple engineering practice and the details thereof will not be described. As previously mentioned, the shaker S including its section S1, the cascade section 20 and the section S2 actually includes a single, continuous slat conveyor which forms an open platform for conveying the vines and their attached tomatoes. The slats 22 forming the conveying platform are best seen in FIG. 2, and as mentioned, these slats are connected at their ends to side chains 24 which serve to propel the conveyor endlessly around the machine.

The lower portion of the endless shaker conveyor is driven and includes various idler and direction changing sprockets. It is to be understood that as seen in FIGS. 1A and 2, the idler pulleys are paired, there being one for each chain 24, but for convenience, the sprockets and idlers at only one side of the conveyor are illustrated in FIGS. 3 and 3A. These remarks apply also to the shaker mechanism which is duplicated at each side of the conveyor, as also seen in FIG. 1A, but with only one side appearing in FIGS. 3 and 3A.

The shaker conveyor chains pass around front fixed idlers 132 (FIG. 3) and rear fixed idlers 134 (FIG. 3A). These idlers also appearing in FIGS. 1 and 2. The conveyor also passes over a series of lower idlers or direction changing sprockets 136 to (FIGS. 1 and 2) which cause the chain to encompass the undershaker conveyors F1, F2 as well as the cross conveyors G1, G2 at the rear of the machine.

The shaker conveyor chains 24 are driven by driving sprockets 148 connected to the hydraulic motor 104 mentioned previously.

SHAKER SECTION S1

As seen in FIG. 3, the chains 24 forming the elevating and shaking portion of the shaker portion S1 are supported on rollers 149 suspended from inclined frame elements 131.

The shaker section S1 includes front (product receiving) oscillating idlers 150 rotating on the free ends of idler follower arms 152, which arms are pivoted at 154 to the frame on the axes of the front fixed idlers 132 previously mentioned. The counterparts of the front fixed idlers 132 are rear fixed idlers 156 mounted on the frame at the cascade section 20 of the shaker. Rear oscillating idlers 158 are mounted on each side of the machine on the free ends of oscillating levers 160, which levers are pivoted at 162 on the frame about the axes of the rear fixed idlers 156 just described. The pivots 162 are actually stub shafts mounted in bearing blocks 164 mounted on the frame, as seen in FIG. 1A.

In order to cause the front and rear oscillating pulleys 150, 158 to move together, long connecting links 166 are pivoted at 168 (FIG. 3) to the idler follower arms 152 and at 170 (FIGS. 1A and 3) to an intermediate portion of the oscillating levers 160. These pivots are on the axes of the oscillating idler pulleys 150, 158. Thus, oscillation of the levers 160 causes simultaneously oscillation of the idler follower arms 152 with consequent oscillation of the front and rear sets of oscillating sprockets 150, 158. THis This causes the conveying reach of the shaker conveyor section S1 to oscillate back and forth relative to the frame relative in a manner which is apparent from the drawings.

The levers 160 are oscillated by means of extensions 172 connected to oscillating links 174 at pivots 156. The links 174 are reciprocated by cranks 178 (FIGS. 1A and 3) pivoted to the links at 180. As seen in FIG. 1A, the two cranks 178 are mounted on a crankshaft 182 supported in bearing blocks 184 suspended from the frame assembly 130. Keyed to the crankshaft 182 is a drive sprocket 186 which is driven by a pinion and chain assembly 188 operated by the hydraulic motor 106 previously mentioned.

SHAKER SECTION S2

The links operating the shaker section S2 are quite similar to those for the shaker section S1. The conveyor reach which is oscillated has its side chains 24 supported on rollers 155 mounted on the frame, which rollers appear in FIGS. 3 and 5.

The shaking section S2 is oscillated by downwardly projecting oscillating levers 190 which form extensions of the oscillating levers 160 for the section S1. The free ends of the levers 190 mount front oscillating pulleys 192, one at each side chain 24. The delivery end of the shaking section S2 also includes the rear fixed rollers 134, previously described, and rear oscillator following arms 194 are pivoted to the frame at 195 on the axes of the rollers 134 (FIG. 3A). The free ends of arms 194 mount rear oscillating pulleys 196. Rear oscillating arm connecting links 198 connect the oscillating lever extensions 190 to the rear following arms 194 by means of pivots 200 (FIG. 3) at the front oscillating pulleys 192, and pivots 202 (FIG. 3A) at the follower levers 194 and associated pulleys 196.

Thus, it can be seen that when the oscillating cranks 178 are rotated by the crank shaft 182 (FIG. 1A) and the oscillating motor 106, the oscillating links 174 rock the oscillating lever portions 160, 190 about the pivots 162 (FIG. 3). This causes a longitudinal oscillation of the shaker section S1 in one direction and a simultaneously longitudinal vibration of the shaker section S2 in the other direction.

TYPICAL DIMENSIONS

The diagram of FIG. 4 shows typical dimensions of the preferred embodiment of the invention. The throw of the cranks 178 is indicated at $a$ in FIG. 4 and in this embodiment of the invention, the throw is 2 inches, giving a 4-inch total stroke. The crank shaft 182 is rotated over a range of about 225—260 r.p.m. The distance $c$ from the frame pivot 162 of the upper oscillating lever 160 and the tomato supporting surface of the section S1 is about 9½ inches. The distance $b$ between the frame pivot 162 of the lever 160 and the pivot 176 for the oscillating link 174 and the oscillating lever extension 172 is in this embodiment about 10½ inches, as is the distance $d$ between the frame pivot 162 and the upper reach of the shaker section S2. These dimensions give a maximum velocity of oscillation of about 215—247 feet per minute, which is approximately 1½ times greater than the linear velocity of the shaker conveyor chains 24, which velocity is about in the range of 130—150 feet per minute. The 4-inch crank shaft stroke gives a vertical shaking motion of about seven thirty-seconds inches, which augments the linear shaking actions in the path of tomato travel.

SHAKING AND FLUFFING OPERATION

FIG. 5 illustrates the shaking and fluffing operation provided by the shaker section S1, the cascade section 20 and the shaker section S2. While passing over the shaker section S1, the mass of vines and tomatoes is linearly advanced at 130—150 feet per minute, but superimposed on that advance are oscillations having a maximum velocity in the range of about 215—247 feet per minute. This imparts vigorous shaking action to the conveyor section S1 in the direction of conveyor travel. Also, the seven thirty-second inch vertical shaking action contributes to the shaking action, so that the shaker section S1 detaches most (about 75 percent, depending upon crop maturity) of the of the tomatoes VT from their vines V. The detached tomatoes fall on the upper reach of the undershaker conveyor F1 as previously described, which conveyor is directed by idlers to deposit the tomatoes thus detached onto one or the other of the rear lateral collecting conveyors G1, G2.

When the tomatoes are propelled or cascaded off the delivery end of the conveyor section S1 at pulleys 158, the vines are fluffed and the vines and tomatoes are tumbled so that tomatoes VT that were formerly trapped or embedded in the mass of vines of tomatoes are freed therefrom. The drop of over 18 inches from the delivery end of the conveyor section S1 to the receiving end of the conveyor section S2 is adequate to permit air resistance on the vines to retard the vines more than it retards tomatoes so that the tomatoes tend to land near the bottom of the heap on the moving conveyor section S2. The linear velocity of this conveyor section, which as described is 130—150 feet per minute, takes tomatoes and vine groups away from the cascade section 20 relatively rapidly, so that vines and tomatoes newly arriving on the conveyor section S2 to find a clean or open spot that facilitates detachment.

This tumbling, fluffing reorientation of the mass of vines and the tomatoes attached thereto insures that substantially all the tomatoes that are still attached to the vines when they reach the second conveyor section S2 will be stripped from the vines during the shaking action that ensues on that conveyor.

The aforesaid tumbling, cascading and vine operation is enhanced by the horizontal velocity and components imparted to the tomatoes by the oscillation of the conveyor section S1. These horizontal velocity components are greater than the linear velocity of the platform that supports the tomatoes on the conveyor section S1 and hence remain as independent components during the falling action of the tomatoes at the cascade section 20. As various tomato-laden parts of the vine drop over the cascade tomato section, the tomatoes at one zone will have velocities in one direction whereas tomatoes in another zone may have different velocities in that direction or even velocities in the opposite direction. These rapid, horizontal velocity components, which are stored as momentum in the tomatoes to a greater extent than in the vines, continue to act on the tomatoes as they fall and hence assist in the reorientation and fluffing action at the cascade section 20.

As a result of the relatively rapid take-away action at the conveyor section S2, the relatively rapid oscillatory motion applied to the tomatoes on the conveyor section S1, and the provision of the cascade section for permitting these actions to facilitate reorientation of tomatoes as they reach the second shaker section S2, has been found that the shaking action of S2 is efficient. It will also be noted that these beneficial results are accomplished by relatively short (2 inch) throw of the oscillating shaker cranks 178. It will be further noted that when the conveyor section S1 is moving in one direction, the conveyor section S2 is moving in the opposite direction. These direction reversals magnify or make more vigorous the reorientation and new presentation conditions just described. These reversals between the two conveyor sections S1, S2 have a further advantage of preventing excessive vibration of the entire shaker assembly.

Although the best mode contemplated for carrying out the present invention has been herein shown and described, it will be apparent that modification and variation may be made without departing from what is regarded to be the subject matter of the invention as set forth in the appended claims.

We claim:
1. The method of detaching tomatoes from their vines comprising the steps of linearly advancing a mass of vines and attached tomatoes, superimposing on the linear motion of the mass an oscillatory motion which is back and forth along said linear path of advance and which has a maximum velocity that substantially exceeds the linear advance velocity of the mass for detaching tomatoes from the mass; dropping out detached tomatoes along said path, dropping the remaining linearly moving and oscillating mass of vines and tomatoes at the end of said path and tumbling and fluffing the falling mass; catching the falling mass and shaking the tumbled and fluffed mass immediately upon catching the same for detaching tomatoes therefrom.

2. The method of claim 1, wherein said linear mass velocity is about 130—150 feet per minute.

3. The method of claims 1 or 2, wherein said maximum oscillation velocity is over 1½ times the linear velocity of the mass.

4. The method of claim 1, wherein said oscillatory shaking motion imparted to said linearly advancing mass includes a vertical motion of the mass.

5. The method of claim 1, wherein the tumbled and fluffed mass is shaken by an oscillatory motion like that previously imparted to the mass but at a greater maximum velocity.

6. Apparatus for detaching tomatoes or the like from their vines comprising means for feeding a mass of vine attached tomatoes to an endless open conveyor having an elevated discharge end; means for imparting an oscillatory motion to the conveyor and hence the mass along its path of movement which oscillatory motion has a maximum velocity that substantially exceeds the linear velocity of the conveyor for detaching tomatoes from the mass, said conveyor dropping the mass off the end thereof for tumbling and fluffing the falling mass; a second conveyor disposed below the discharge of said first named conveyor and running in the same direction for catching the falling mass directly and means associated with said second conveyor for shaking the tumbled and fluffed mass thus detaching additional tomatoes therefrom.

7. The apparatus of claim 6, wherein said shaker section oscillating means comprises generally vertical intermediate lever means pivotally mounted adjacent its midportion at said dropoff section, means connected adjacent one end of said lever means for oscillating the lever means, follower lever means at the receiving end of said first shaker section and at the discharge end of said second shaker section, and links interconnecting said follower and intermediate lever means.

8. The apparatus of claim 7, wherein the pivot for said intermediate lever means is farther from the link connection for said second shaker means than from the link connection for said first shaker means to impart an oscillation velocity to the second shaker means that exceeds that of the first shaker means.